Patented Sept. 27, 1938

2,131,650

UNITED STATES PATENT OFFICE 2,131,650

FRUIT WHIP AND PROCESS FOR THE PREPARATION THEREOF

Byron H. Webb, Washington, D. C., assignor to Secretary of Agriculture of the United States of America No Drawing. Application April 16, 1937, Serial No. 137,284

2 Claims. (Cl. 99—100)

(Granted under the act of March 3, 1883, as amended April 30, 1928; 370 O. G. 757)

This applicattion is made under the act of March 3, 1883, as amended by the act of April 30, 1928, and the invention herein described and claimed may be used by or for the Government of the United States or any of its officers and employees in the prosecution of work for the Government, without the payment to me of any royalty thereon.

Sterilization in sealed containers by heat is the method commonly employed to preserve many food products. If the product to be sterilized contains normal milk or cream difficulty with heat coagulation of the casein of the milk is often encountered. The most important factor to be considered in the sterilization of evaporated milk, coffee cream, cream soups, and other products containing milk, is how to prevent a hard coagulum of casein from forming. The development of hard lumps of coagulated casein in sterilized products has in many cases made it impossible to successfully prepare products containing any appreciable quantity of milk constituents. This is especially true of acid foods such as fruits and fruit juices.

Casein is not only coagulated at high temperatures of heating but it is also precipitated by acid. For this reason it is not possible to mix milk or cream with fruit juices, because of the complete coagulation of casein by the acid fruit. This reaction occurs very rapidly, especially at high temperatures. I have found that casein-free milk serum can be mixed with acid juices to produce mixtures possessing a smooth body and excellent flavor. I have discovered that these mixtures may be canned and processed without detrimental effects to flavor or body, and with much of the protein remaining soluble.

The process which I have discovered will eliminate the troublesome heat coagulation of casein in heated or sterilized products. My process involves the use or substitution of the milk serum proteins for casein in the material to be sterilized. Under proper conditions the serum proteins, consisting chiefly of albumin and globulin, do not form such a hard coagulum during heating as does casein. They will withstand high acid at ordinary temperatures without coagulating.

Products suitable for the purpose of my invention may be obtained in several ways. Normal milk serum may be obtained by precipitation of the casein from milk, by means of rennet. Such sweet casein-free serum forms one of the best sources of milk constituents from which to prepare my products. These products can also easily be prepared from whey powder.

My invention applies to acid foods, which may contain fruits or fruit juices, and which do not require high sterilization temperatures.

The application of my process to acid foods, such as pineapple, citrus and other fruit juices, or to strawberries, loganberries, or other berries, provides a method of manufacturing new combinations of fruit and milk serum products. Dilute mixtures may also be prepared to be used as beverages. Ice-cream mix suitable for freezing in a mechanical refrigerator may be prepared by adding whipped cream to my new product.

Attractive mixtures of fruit, sugar, flavoring and gelatin, with approximately 6 to 14% serum solids from milk, may be processed at low temperatures to yield products which possess high whipping qualities, although they contain no butterfat. The low processing temperatures can be used because of the high acidity of the products. A reaction of pH 4.5 or less can be easily obtained from the fruit acid.

An important feature of my new fruit whips is their ability to incorporate air during whipping. I am able to develop from 100% to 400% overrun during a 2 or 3 minute whipping period. Whipping properties of this magnitude are due to the unique composition of my whips and to the fact that the milk albumin contained in the serum solids I add remains partly in soluble form.

Although wide variations in the quantities of sugar, gelatin or edible gum, fruit and serum solids are permitted, the following example illustrates the manufacture of my new fruit whips:

For each 1000 grams of product I add approximately 120 grams of soluble milk serum solids, 10 grams of gelatin, 30 grams of water, 200 grams of sugar, and approximately 660 grams of crushed fruits or fruit juice. Flavoring materials, such as vanilla extract, may also be used to suit the taste. This mixture is processed in cans at a time and temperature which will give it permanent keeping qualities. I recommend the use of a temperature of substantially 85° C. for approximately 20 minutes.

Having thus described my invention, what I claim for Letters Patent is:

1. A new product consisting of a mixture of a concentrated form of soluble milk serum, crushed fruit, and flavoring materials, in which the milk serum solids range from 6 to 14 percent, and which is capable of producing a stable whip.

2. A new product consisting of a mixture of soluble whey power, crushed fruit, gelatine, and flavoring materials, in which the milk serum solids range from 6 to 14 percent and in which the acidity is substantially pH 4.5, and possessing relatively high whipping properties.

BYRON H. WEBB.